UNITED STATES PATENT OFFICE.

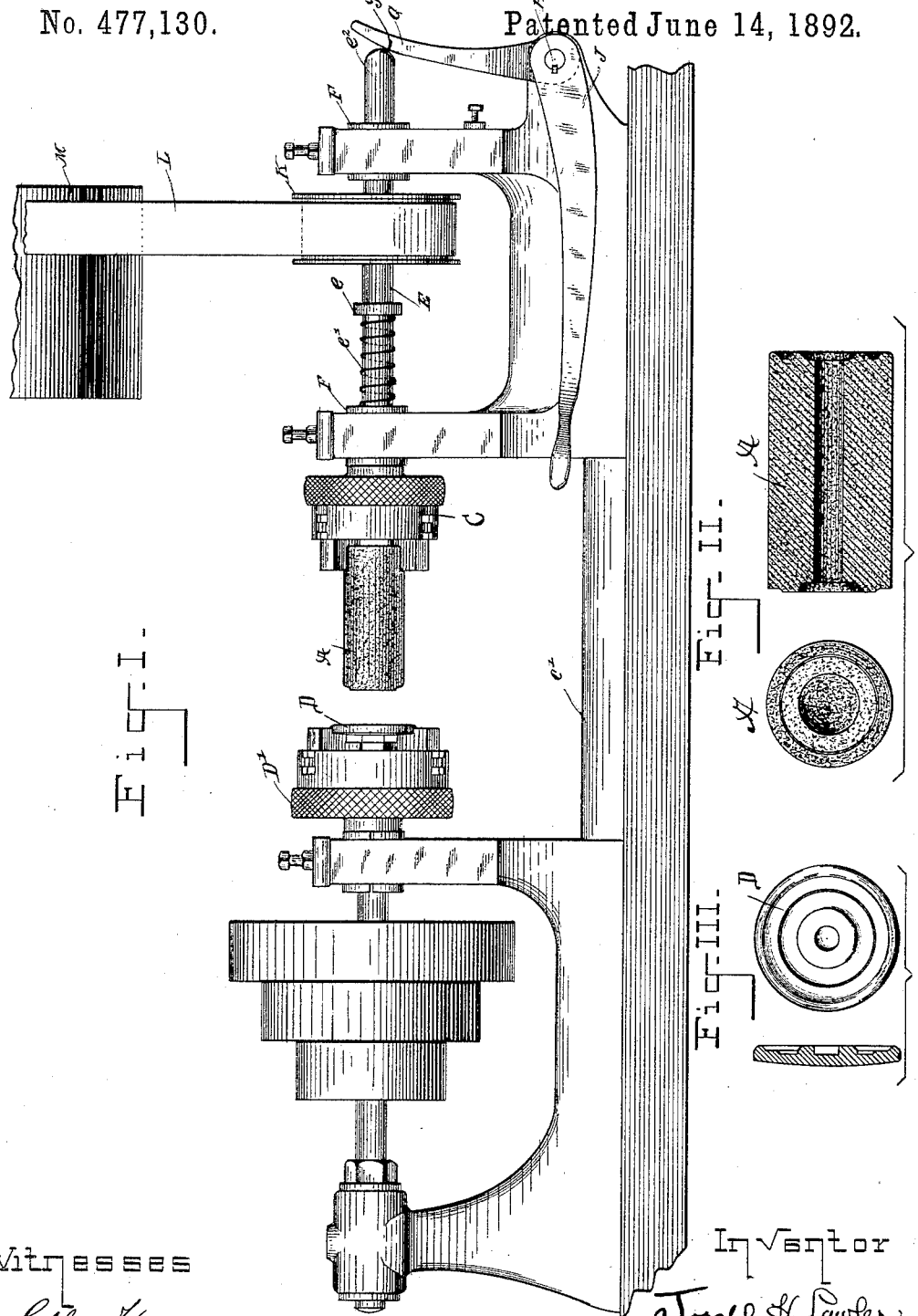

JOSEPH H. LAWLES, OF NEW YORK, N. Y.

MACHINE FOR TURNING PATTERNS ON PEARL, IVORY, OR OTHER SUBSTANCES.

SPECIFICATION forming part of Letters Patent No. 477,130, dated June 14, 1892.

Application filed November 8, 1890. Serial No. 370,792. (No model.)

*To all whom it may concern:*

Be it known that I, JOSEPH H. LAWLES, a citizen of the United States, residing in the city, county, and State of New York, have invented certain new and useful Improvements in Machines for Turning, Shaping, and Forming Patterns on Pearl, Ivory, and Similar Substances, of which the following is a specification.

My invention relates to an improved method of reducing mother-of-pearl or other like substances to commercial shapes, and is specially devised for the purposes of manufacturing what is known as "pearl buttons."

My invention particularly consists in providing a lathe with an emery former or shaper, rotating said emery former at any desired speed, placing the article to be turned or reduced in an opposed position, and reducing the article to the desired shape by means of the emery former, the said former being provided on its grinding-face with a suitable configuration, which will produce a complementary configuration upon the button or other article. Heretofore in the manufacture of such devices it has been customary to mount the pearl in a lathe and reduce the same to its desired shape by means of special metallic tools held in position by the operator as the spindle carrying the article is rotated.

For the better understanding of my invention I will proceed to describe it in connection with the accompanying drawings, which form a part of this specification, and in which—

Figure I represents a portion of a lathe and one of the buttons mounted thereon on one side and the reducer or former upon the other side. Fig. II shows in an end elevation and a transverse sectional view the two forms of my improved former. Fig. III is a sectional and end view of a pearl button after having been operated upon by the emery former.

The reducer or former A is mounted in the chuck C of the lathe C', and is so arranged that it can be rotated at any desired speed and moved longitudinally up to and away from the article to be operated upon. The article or button D is mounted in a chuck D' of the lathe in an opposed position to the former A, as shown in Fig. I, and is arranged to rotate, so that as the former is rotated and pushed toward it by means presently to be described the hard surface of the emery will grind and reduce the surface of the button. The end of the former A is provided with rings or raised surfaces and annular grooves, which form complementary grooves on the article being manipulated. For instance, a groove upon the wheel or former will produce a raised portion or ring upon the button. The former is provided, preferably, with a hollow space extending from one end to the other, so that the filings or shavings from the pearl will feed through it, and by this means I am enabled to produce pearl buttons and like articles much more economically than has heretofore been done by the old process. The former may, however, be solid. I have shown both forms, though I prefer employing the hollow former, as it gives greater satisfaction.

Any suitable means may be employed for rotating the chuck C and moving it longitudinally; but I prefer the means illustrated in Fig. I of the drawings.

The chuck C is rigidly mounted upon a shaft E, which is rotatably supported in suitable journal-bearings F F'.

$e$ is a collar formed on the shaft E, and $e'$ is a spiral spring surrounding said shaft and confined between the bearing F and the collar $e$ to hold the shaft F, carrying the former A in its outer or disengaged position.

$e^2$ is a projecting end of the shaft, against which impinges the curved surface $g$ of an arm G, keyed to the rock-shaft H.

J is an operating arm or lever also keyed to the rock-shaft H and extending over toward the center of the machine in convenient position for the operator. By pressing down on the lever J it is quite obvious that the shaft F will be pushed inward against the action of the spiral spring, so that the former A will be pressed against the article D, the pressure being varied at will.

K is a band-pulley keyed to the shaft F, and L is a friction-belt passing from said pulley to the power-drum M, by means of which the shaft F is rotated, the drum allowing for the longitudinal movement of the shaft.

Having thus described my invention, the following is what I claim as new therein and desire to secure by Letters Patent:

The combination, with a lathe, as shown, of a chuck for holding the article to be operated upon, an opposed rotating chuck for holding the former and adapted to be moved longitudinally, said former having configurations on its end to form a complementary configuration on the article, and a longitudinal hollow space or tube through the center of the former of sufficient size to allow the filings to pass off, as set forth.

JOSEPH H. LAWLES.

Witnesses:
 HERBERT KNIGHT.
 M. V. BIDGOOD.